United States Patent
Parazzoli et al.

(10) Patent No.: US 8,240,609 B2
(45) Date of Patent: Aug. 14, 2012

(54) SYSTEM AND METHOD FOR REDUCING VISCOUS FORCE BETWEEN A FLUID AND A SURFACE

(75) Inventors: Claudio G. Parazzoli, Seattle, WA (US); Minas H. Tanielian, Bellevue, WA (US); Robert B. Greegor, Auburn, WA (US)

(73) Assignee: The Boeing Company, Chicago, IL (US)

( * ) Notice: Subject to any disclaimer, the term of this patent is extended or adjusted under 35 U.S.C. 154(b) by 786 days.

(21) Appl. No.: 12/330,138

(22) Filed: Dec. 8, 2008

(65) Prior Publication Data

US 2010/0326534 A1    Dec. 30, 2010

(51) Int. Cl.
*B64C 3/36* (2006.01)

(52) U.S. Cl. ..... 244/130; 244/200; 244/205; 428/692.1; 428/693.1

(58) Field of Classification Search ................... 244/130, 244/200, 205
See application file for complete search history.

(56) References Cited

U.S. PATENT DOCUMENTS 2,102,527 A * 12/1937 Hadley ........................... 244/130

FOREIGN PATENT DOCUMENTS

WO    2005089176    9/2005

OTHER PUBLICATIONS

Pendry, J.B., et al. "Magnetism from Conductors and Enhanced Nonlinear Phenomena." IEEE Transactions on Microwave Theory and Techniques, vol. 47, No. 11, Nov. 1999 pp. 2075-2084.*
Yuan, Hsiao-Kuan, et al. "A negative permeability material at red light." Optics Express vol. 15, No. 3, pp. 1076-1083. Feb. 5, 2007.*
Pendry, John. "Manipulating the Near Field With Metamaterials." Optics & Photonics News, pp. 1-6. Sep. 2004.*

(Continued)

*Primary Examiner* — Tien Dinh
*Assistant Examiner* — Michael Kreiner
(74) *Attorney, Agent, or Firm* — Novatech IP Law; Sean O'Neill; Euclid Woo

(57) ABSTRACT

A metamaterial has a magnetic permeability response at frequencies sufficient to generate a repulsive force between a fluid and a surface to which the metamaterial may be applied. The metamaterial may be nanofabricated such that an absolute value of the magnetic permeability of the metamaterial is substantially greater than an absolute value of an electric permittivity of the metamaterial. The metamaterial may generate a repulsive force between the surface and the fluid moving relative to the surface and thereby reduce viscous drag of the fluid on the surface. A method of reducing the viscous drag of the fluid moving past the surface includes producing relative motion between the surface and the fluid and generating the repulsive force between the surface and the fluid.

16 Claims, 5 Drawing Sheets

OTHER PUBLICATIONS

Alireza V. Amirkhizi and Sia Nemat-Nasser. "Composites with tuned effective magnetic permeability." J. Appl. Phys. 102, 014901. Published online Jul. 2, 2007.*

S. Y. Buhmann, Ho Trung Dung, T. Kampf, L. Knöll, and D.-G. Welsch. "Atoms near Magnetodielectric Bodies: van der Waals Energy and the Casimir-Polder Force." Optics and Spectroscopy, vol. 99, No. 3, 2005.*

S.Y. Buhmann, H.T. Dung, T. Kampf, and D.-G. Welsch. "Casimir-Polder interaction of atoms with magnetodielectric bodies." Eur. Phys. J. D 35, pp. 15-30. (2005).*

Weiland, et al. "Ab initio numerical simulation of left-handed metamaterials: Comparison of calculations and experiments." Journal of Applied Physics vol. 90, No. 10, pp. 5419-5424. Nov. 15, 2001.*

PCT International Search Report-WO dtd Apr. 1, 2010 for PCT / US2009 / 065012.

Stefan Buhmann et al., "Ground-State van der Waals Forces in Planar Multilayer Magnetodielectrics," Physical Review A 72, 032112 (2005).

Ulf Leonhardt et al., "Quantum Levitation by Left-Handed Metamaterials," New Journal of Physics 9, 254 (2007).

M.W. Schmidt et al., "General Atomic and Molecular Electronic Structure System (GAMESS)," Journal of Computational Chemistry, vol. 14, Issue 11, pp. 1347-1363.

Hsiao-Kuan Yuan et al., "A negative permeability material at red light," Optics Express, Feb. 5, 2007, vol. 15, No. 3, pp. 1076-1083.

Stefan Buhmann et al., "Two-Atom van der Waals Interaction between Polarizable/Magnetizable Atoms Near Magnetoelectric Bodies," Optics and Spectroscopy, 2007, vol. 103, No. 3, pp. 374-387.

John Q. Xiao, "Left Handed Materials Based on Magnetic Nanocomposites," AFOSR F49620-03-1-0351 Project Final Report, Oct. 18, 2006.

* cited by examiner

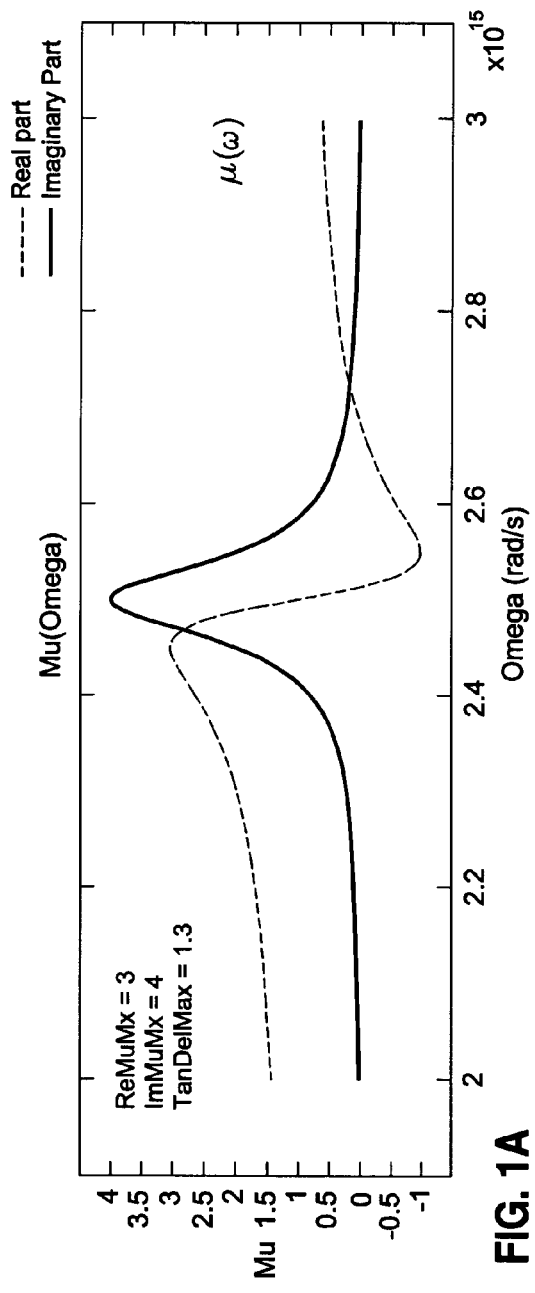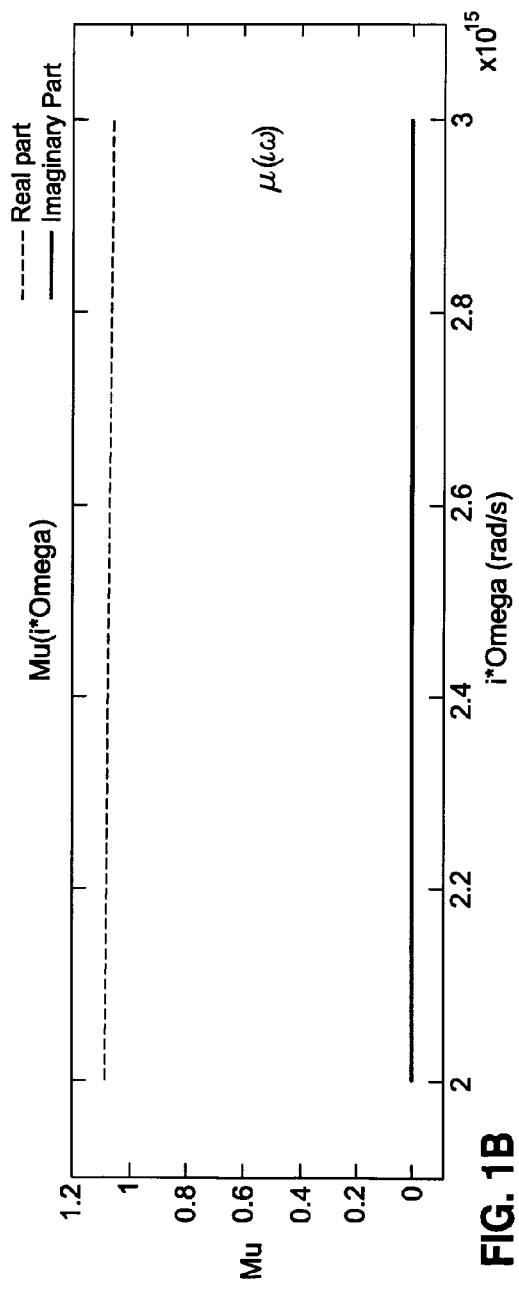

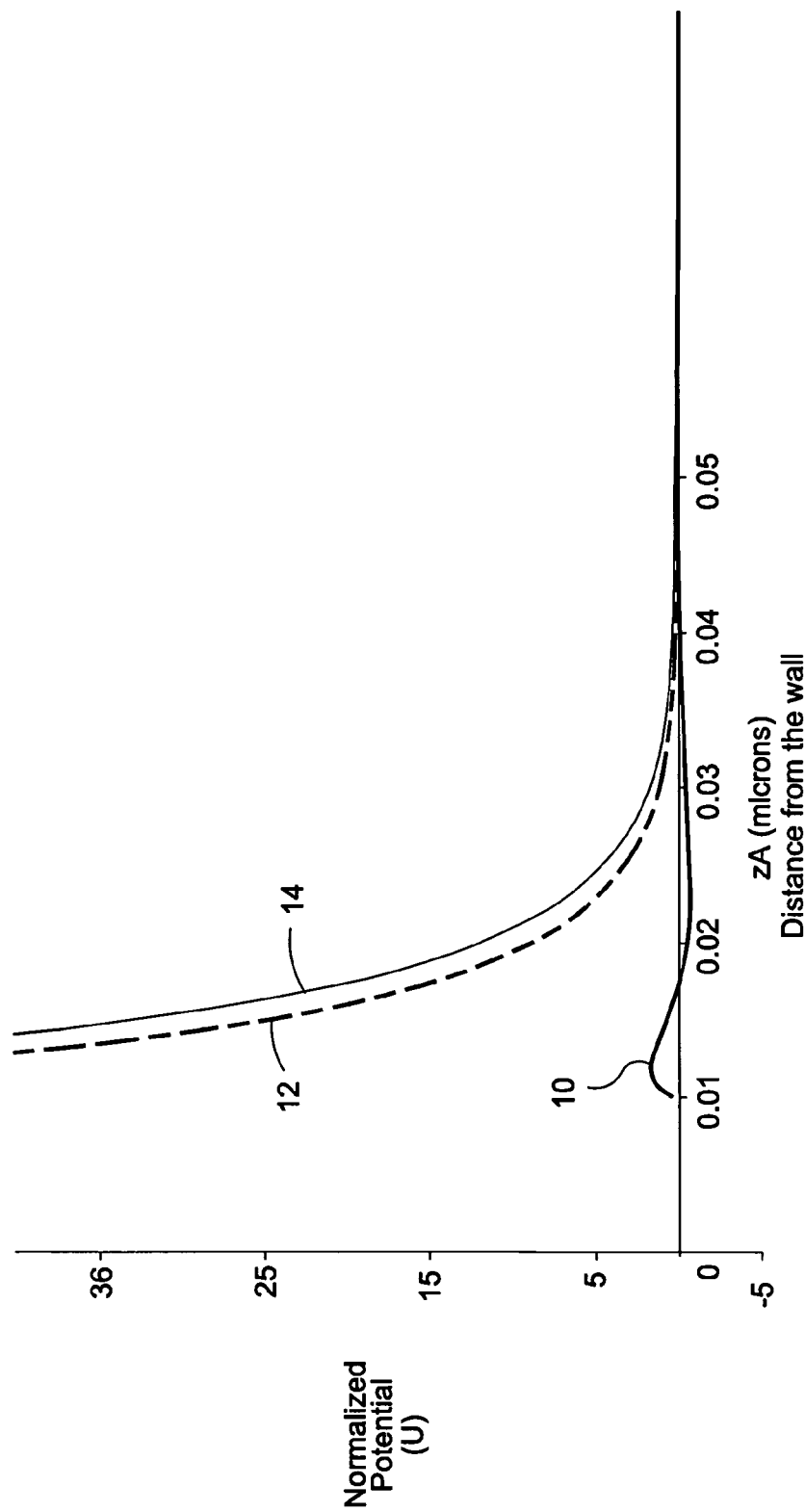

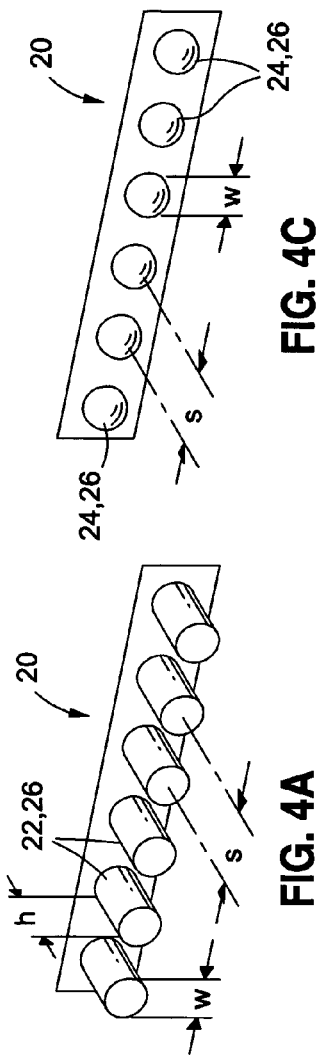
FIG. 4A
FIG. 4C
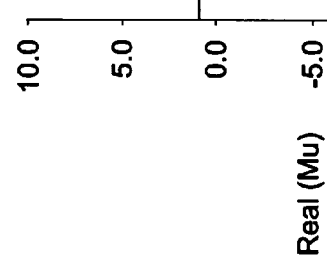
FIG. 4B

SYSTEM AND METHOD FOR REDUCING VISCOUS FORCE BETWEEN A FLUID AND A SURFACE

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to viscous drag and, more particularly, to a metamaterial configured to reduce viscous drag between a fluid and a surface.

BACKGROUND

A major contributor to the inefficiency of an object moving through a fluid is the friction drag or viscous drag that occurs at the boundary layer of the object. Friction drag or viscous drag tends to resist movement of the object through the fluid or movement of fluid over the object. For example, rotating machinery such as a turbine rotating in a fluid is subjected to viscous drag at the boundary layer of the object. In another example, a vehicle such as an aircraft moving through the air is subjected to friction drag or viscous drag at the boundary layer of the vehicle/air interface which tends to impede forward motion of the aircraft.

Included in the prior art are many attempts at reducing viscous drag acting on a surface such as the friction drag acting on an airfoil moving through air or a hydrofoil moving through water. One approach to reducing viscous drag includes forming a plurality of perforations or pores in the surface over which the fluid moves and applying a suction or blowing force to the pores. The application of suction to the pores is based on the principle of removing low energy fluid from the boundary layer of the surface in order to reduce drag. The application of a blowing force to the pores employs the principle of adding higher energy fluid to the boundary layer which delays separation of the boundary layer from the surface. As applied to airfoil or hydrofoil lifting surfaces, delaying separation of the boundary layer increases lift, delays stall at high angles of airfoil attack relative to the moving fluid stream, and thereby improves the efficiency of the lifting surface.

Unfortunately, the application of suction at the pores requires an active vacuum system. Such an active system typically requires the addition of a separate vacuum pump or the addition of a complex series of conduits linking an existing vacuum pump to the pores in the surface. As may be appreciated, the addition of an active vacuum system often results in a heavier system that may result in increased maintenance labor and costs.

Another approach to increasing the efficiency of surfaces moving through a fluid stream includes the use of grooves or riblets on fluid dynamic lifting surfaces. The grooves or riblets may operate to delay flow separation by energizing a boundary layer air stream flowing in proximity to the lifting surface. Grooves or riblets are not intended to reduce drag and may slightly increase viscous drag due to the additional surface area of the lifting surface as a result of the grooves or riblets. Grooves or riblets are provided to energize the boundary layer as a result of boundary layer vortices that form about the trailing edges of the grooves or riblets. The higher energy boundary layer fluid stream separation improves the efficiency of airfoil and hydrofoil lifting surfaces similar to the improved efficiency associated with blowing force technology mentioned above. For smooth surfaces, such vortices move about in the boundary layer air stream and may bounce or deflect off of the lifting surface.

The configuration of the grooves or riblets on the surface may be tailored to the boundary layer air stream and surrounding fluid environment and to the manner in which the lifting surfaces are likely to move relative to the surrounding fluid environment. For example, the grooves or riblets must be oriented along a direction that is generally parallel to the intended direction of movement of the lifting surface relative to the fluid.

As can be seen, there exists a need in the art for a system and method for reducing viscous drag of a surface moving through a fluid and which is preferably a passive system requiring no active components. Furthermore, there exists a need in the art for a system and method for reducing viscous drag of a surface moving through a fluid that performs well when changing directional movement of the lifting surface relative to the fluid. Additionally, there exists a need in the art for a system and method for reducing viscous drag of a surface moving through a fluid that is simple in construction, low in cost, and lightweight.

BRIEF SUMMARY

The above-described needs associated with reducing viscous drag acting on a surface are specifically addressed and alleviated by a metamaterial that may be incorporated as part of and/or that may be applied to a surface moving through a fluid environment such as through air or through a liquid (e.g., water). Preferably, such a metamaterial has a magnetic permeability response at frequencies in the range of between approximately $10^{14}$ and $10^{16}$ Hz and which may span the infrared, visible and ultraviolet bands of the electromagnetic spectrum. The metamaterial generates a repulsive force between the surface and a surrounding fluid stream such as an air stream or a liquid stream in a manner that reduces viscous drag of the fluid on the surface.

The term "metamaterial" is used by those skilled in the relevant arts to describe materials that exhibit properties not found in nature. Atoms and molecules in nature typically experience an attractive force when in proximity to other materials such as materials used for aerodynamic and fluid dynamic surfaces including, without limitation, airfoils and hydrofoils. Those knowledgeable in the relevant fields of technology typically refer to such forces under classical theory as "van der Waals" forces and under quantum theory as "Casimir-Polder-Lifshitz" forces.

The contemplated metamaterials as disclosed herein and the system and methods for using such metamaterials according to the principles of the embodiments disclosed herein reduce, eliminate, and reverse such attractive forces and can enable a repulsive force between a surface and the atoms and/or molecules in a fluid flowing past the surface. The metamaterials as disclosed herein have a magnetic permeability that is responsive to reverse such attractive forces within the $10^{14}$ to $10^{16}$ Hz frequency range of the electromagnetic spectrum to create the repulsive force.

The metamaterial may preferably have a high magnetic permeability and a relatively low electrical permittivity sufficient to generate a repulsive force between the metamaterial applied to or integrated with the surface and the fluid flowing about or over the surface. In one embodiment, the metamaterial may have a magnetic permeability that is larger than an electrical permittivity of the metamaterial by a factor of up to at least 10. The magnetic permeability of the metamaterial as described herein is a dimensionless parameter and refers to the permeability of the material relative to absolute permeability of free space (i.e., $\mu_0 = 4\pi \times 10^{-7}$ Newtons per meter$^2$).

In one embodiment, the metamaterial preferably has a magnetic permeability $\mu(\omega)$ with an absolute value of up to about 25. More preferably, the metamaterial may have a permeability absolute value that is within the range of from about 5 to about 15 with the permittivity absolute value of the metamaterial being smaller by a factor of up to about 10 or larger. The metamaterial may be configured as an integral part of a surface and may also be configured as an appliqué that may be bonded to a surface such as to an exterior surface of a hydrofoil, a boat hull, an automotive surface or other vehicle exterior surfaces such as an aerodynamic surface comprising, for example, an aircraft wing although the metamaterial may be applied to any surface using any suitable means of manufacture, technique, or mechanism.

The present disclosure further contemplates a system of reducing the viscous drag of a fluid moving past a surface by generating the repulsive force between the surface and the atoms and/or molecules in a fluid by use of a metamaterial applied on and/or incorporated into the surface as an integral part of the surface. Also disclosed is a method of forming a metamaterial for application to a surface such that the metamaterial generates a repulsive force between the metamaterial surface and the fluid to thereby reduce viscous drag of the fluid on the surface. More particularly, the contemplated metamaterial(s) may be configured to reverse the van der Waals or quantum attractive force between the fluid and the surface to reduce the viscous drag there between.

The technical benefits of the disclosed embodiments include a passive approach to viscous drag reduction requiring no active components. Furthermore, the disclosed embodiments are effective and operational without regard to the direction of movement between the fluid and the surface.

Due to the passive nature of the metamaterial and the directionally independent operational and functional capabilities, the disclosed embodiments may be advantageously applied to airfoils, hydrofoils, and other fluid dynamic structures for decreasing viscous drag and increasing the efficiency thereof. For example, various embodiments may be applied to aerodynamic surfaces such as an aircraft fuselage, an airfoil such as a wing or a control surface, or any surface for reducing fluid friction and/or for improving the aerodynamics which may result in benefits such as increased lift, reduced drag, and a resulting reduction in fuel consumption for aircraft.

In addition, various embodiments of the metamaterial may be applied to the blades of a turbine engine, compressor, steam turbine or other fluid turbine, turbo-fan blade, rotor blade, propeller blade, and other machinery having components that move through a fluid. Furthermore, various embodiments may be applied to hydrodynamic surfaces such as hulls and other surfaces of watercraft such as boats, ships, and other vehicles. However, application of various metamaterial embodiments may be incorporated as part of and/or applied to any surface wherein reduction of viscous drag associated with fluid flow is desired and which can include all surfaces and skins of air, water, space, and land vehicles.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1A is a plot of the real and imaginary parts of magnetic permeability (Mu or "$\mu$") vs. real wavelength frequency (omega or "$\omega$") for a metamaterial in one embodiment according to the principles of the invention;

FIG. 1B is a plot of the real and imaginary parts of magnetic permeability "$\mu$" vs. imaginary wavelength frequency ($i*\omega$) for the metamaterial of FIG. 1A;

FIG. 3 is a graph of normalized van der Waals potential vs. distance from a metamaterial surface such as that of FIGS. 1A-B and 2 and illustrating variations of the repulsive potential dependent upon electrical response (e.g., variations in permittivity epsilon or "$\in$");

FIG. 4A is a perspective view of a nanofabricated metamaterial comprising spaced nano-cylinders in accordance with the principles of the invention;

FIG. 4B is a graph of a real part of magnetic permeability "$\mu$" vs. wavelength frequency "$\omega$" and illustrating magnetic permeability response for the metamaterial of FIG. 4A;

FIG. 4C is a perspective view of a nanofabricated metamaterial comprising spaced nano-spheres in accordance with the principles of the invention;

DETAILED DESCRIPTION

Figure 2:
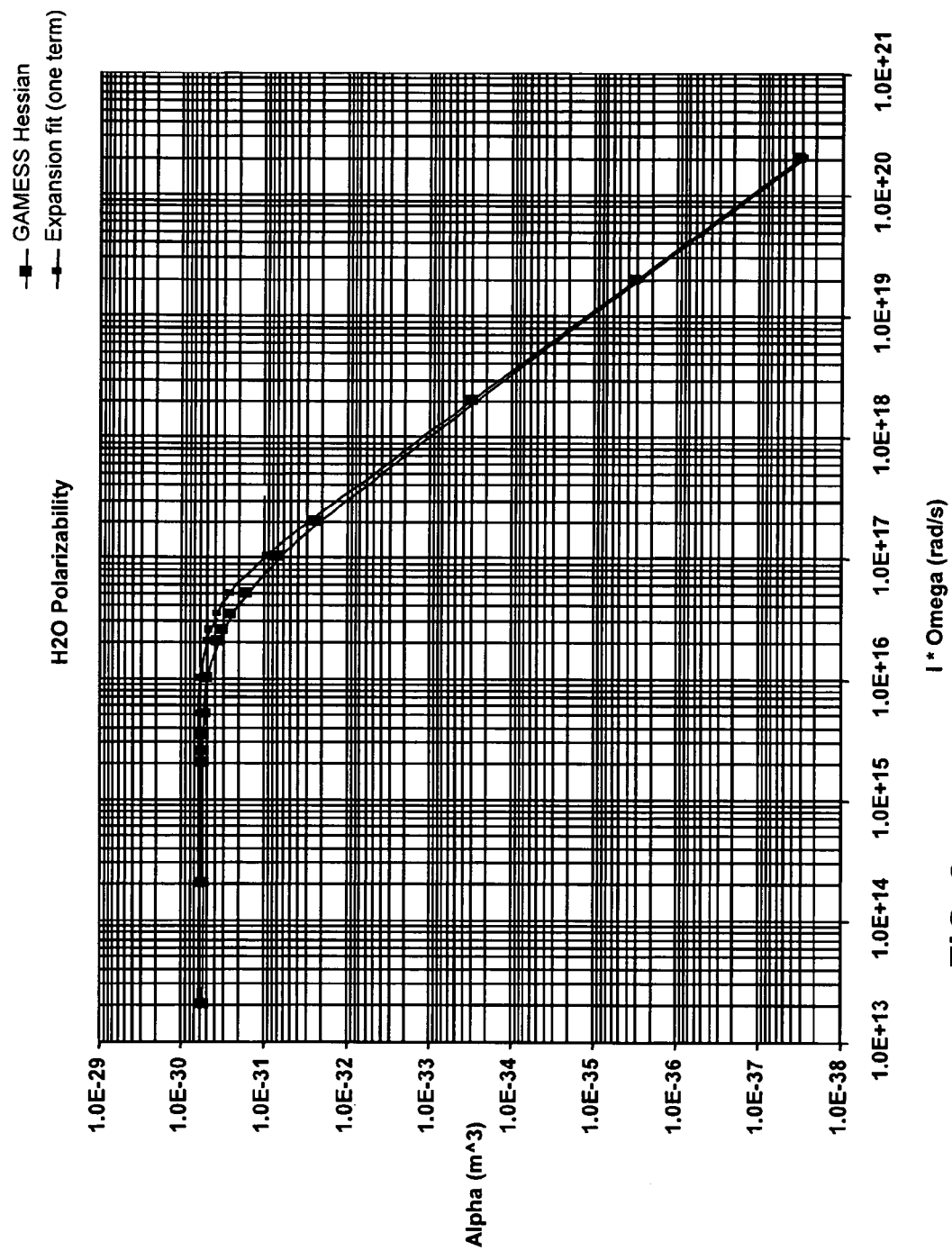
FIG. 2 is a graph of polarizability of water vs. imaginary wavelength frequency ($i*\omega$) and wherein the graph used a software simulation to compute an approximation of polarizability.

Referring now to the drawings wherein the showings are for purposes of illustrating preferred and various embodiments of the disclosure only and not for purposes of limiting the same, FIGS. 1-5C illustrate various aspects of the embodiments of the invention for reducing viscous drag of a surface moving through a fluid by exploiting properties of a metamaterial that enable, among other capabilities, the reduction, elimination, and/or reversal of the attractive forces that exist between atoms and molecules of a fluid and a surface.

Embodiments as disclosed herein and as contemplated by the principles of the invention may preferably incorporate one or a combination of metamaterials preferably having high magnetic permeability and low electrical permittivity properties that are sufficient to generate a repulsive force between the metamaterial and the fluid flowing over the surface. As used in this disclosure, the term "van der Waals force" refers to and is typically characterized as the totality of attractive or repulsive forces between atoms and molecules (or between parts of the same molecule) of a fluid wherein the atoms and molecules are in close proximity to a surface. Under classical theory, those skilled in the art refer to such forces as van der Waals forces and under quantum theory, as "Casimir-Polder-Lifshitz" forces.

The metamaterials as disclosed herein in the system and method for using such metamaterials may reduce, eliminate, and reverse such attractive forces and can enable a repulsive force between a surface and the atoms and/or molecules in a fluid flowing past the surface. The metamaterial embodiments as disclosed herein in the system and method of use thereof have a magnetic permeability that is responsive to reverse such attractive forces at specific frequencies of the electromagnetic spectrum to create the repulsive force. The metamaterial preferably has a magnetic permeability response at frequencies in the range of between approximately $10^{14}$ and $10^{16}$ Hz although magnetic permeability response at frequencies outside of this range are contemplated. The metamaterial generates the repulsive force between the surface and the surrounding fluid stream such as an air stream or a liquid stream in a manner that reduces viscous drag of the fluid on the surface.

In one embodiment, the metamaterial preferably has an absolute value of magnetic permeability $\mu(\omega)$ of up to approximately 25 (i.e., $-25 \leq \mu(\omega) \leq 25$) although the metamaterial may have a magnetic permeability absolute value that is greater than 25. The magnetic permeability as described herein is a dimensionless parameter and refers to the permeability of the material relative to the absolute permeability of free space (i.e., $\mu_0 = 4\pi \times 10^{-7}$ Newtons per meter$^2$). In a more preferable embodiment, the metamaterial may have permeability that is within the range of from about 5 to about 15 (absolute value). The metamaterial preferably has a magnetic permeability that is greater than an absolute value of electrical permittivity of the metamaterial by up to a factor of approximately 10 or greater at frequencies in the range of between approximately $10^{14}$ and $10^{16}$ Hz although the preferred permeability and permittivity properties may occur at frequencies above and below the preferred frequency range.

In addition, the metamaterial may have a magnetic permeability absolute value that is greater than the permittivity absolute value by any factor including factors greater than 10. A metamaterial having a magnetic permeability of approximately −15 and a electrical permittivity of approximately 1.5 (i.e., difference by factor of 10) may result in a repulsive potential between the metamaterial (e.g., applied to or incorporated into a surface) and an atom/molecule of a fluid in proximity to the surface. The metamaterials having the above-described magnetic permeability and electrical permittivity properties are effective in generating the repulsive force between the metamaterial and a fluid flowing over the surface for a given set of material parameters as is described in greater detail below.

Metamaterials as disclosed herein may further be configured (e.g., nanofabricated) to have negative magnetic permeability and may exhibit a negative magnetic resonance behavior (i.e., an increase in magnitude of permeability) at certain wavelengths. The permeability is preferably larger than the permittivity of the metamaterial by a factor of 10 or above to produce a repulsive potential. As disclosed by Yuan et al. in "A Negative Permeability Material at Red Light" Optics Express, Volume 15, Issue 3, Feb. 5, 2007, page 1077, the entire contents of which is incorporated by reference herein, a nanostructured metamaterial having a thickness δ can be characterized as having an effective refractive index expressed as n=n'+in" and an effective impedance expressed as η=η'+iη". Here, n' and in" are the real and imaginary refractive indices, respectively, of the effective refractive index n. Likewise, η' and iη" are the real and imaginary impedances, respectively, of the effective impedance η.

Yuan indicates that to obtain such parameters (i.e., effective refractive index n and effective impedance η), the complex values of the transmitted and reflected fields may be obtained through experimentation and/or through simulation. In addition to having an effective refractive index n and effective impedance η, a thin film of a nanostructured metamaterial can be characterized by its effective permittivity $\in = \in' + i\in''$ and permeability $\mu = \mu' + i\mu''$ which may be defined as $\in = n/\mu$ and $\mu = n\eta$. Here, $\in'$ and $i\in''$ are, respectively, the real and imaginary permeability of the effective permeability $\in$. Likewise, $\mu = \mu' + i\mu''$ are, respectively, the real and imaginary permittivity of the effective permeability $\mu$.

Negative index metamaterials (NIMs) have a negative electrical permittivity and a negative permeability and may be referred to by those skilled in the art as having left-handed electromagnetism as disclosed in Yuan. NIMs may also be referred to as left-handed materials and may exhibit a magnetic resonant behavior at wavelengths that fall within the $10^{14}$ to $10^{16}$ Hz region. Yuan indicates that the magnetic resonance in such an NIM includes a real part of the effective refractive index that is negative either through the strong condition $\mu' < 0$ and $\in' < 0$ or through a more general condition $\in'\mu'' + \mu'\in'' < 0$.

In an embodiment disclosed herein, a metamaterial may be fabricated to have a magnetic permeability sufficient to effect a reversal of the van der Waals attractive force (or a reversal of the Casimir-Polder-Lifshitz attractive force). The metamaterial may be fabricated according to the principles of the embodiments disclosed herein and may reduce, eliminate, and/or reverse such attractive forces and can enable a repulsive force. The metamaterial and system of use thereof may be configured to reverse the van der Waals or quantum attractive force between the fluid and the surface to reduce the viscous drag there between. In this manner, the metamaterial may generate the repulsive force between a surface and the atoms and/or molecules in a fluid flowing past the surface. As indicated above, such a metamaterial may also be characterized as a left-handed metamaterial. A repulsive potential may be generated in the proximity of a surface for surface materials that have appropriate magnetic and electrical responses.

For an atom disposed in front of a magneto-dielectric plate modeled by a semi-infinite half space, the van der Waals potential $U(z_A)$ may be determined using Equation (27) as disclosed on Page 5 of "Ground-State van der Waals Forces in Planar Multilayer Magnetodielectrics" by Buhmann et al., Physical Review A 72, No. 032112 (2005) (hereinafter "Buhmann"), the entire contents of which is incorporated by reference herein. Equation (27) from Buhmann is as follows:

$$\underline{U}(z_A) = \frac{\hbar \mu_0}{8\pi^2} \int_0^\infty du\, u^2 \alpha^{(0)}(iu) \int_0^\infty dq\, \frac{q}{b} e^{-2bz_A} \times \left[ \frac{\mu(iu)b - b_M}{\mu(iu)b + b_M} - \left(1 + 2\frac{q^2 c^2}{u^2}\right) \frac{\varepsilon(iu)b - b_M}{\varepsilon(iu)b + b_M} \right]$$

In the above equation, the electric permittivity and (paramagnetic) permeability may be modeled, respectively, by the following equations, also disclosed in Buhmann:

$$\varepsilon(\omega) = 1 + \frac{\omega_{Pe}^2}{\omega_{Te}^2 - \omega^2 - i\omega\gamma_e},$$

$$\mu(\omega) = 1 + \frac{\omega_{Pm}^2}{\omega_{Tm}^2 - \omega^2 - i\omega\gamma_m},$$

$$b_M \mapsto \sqrt{\frac{u^2}{c^2}[\varepsilon(iu)\mu(iu) - 1] + b^2},$$

and $$\sqrt{\frac{u^2}{c^2} + q^2} \equiv b,$$

In the above expression:

$U(z_A)$ represents the van der Waals potential wherein z is distance of the atom/molecule (denoted by subscript A) from the surface;
$\hbar$=Planck's constant (6.62×10$^{-34}$ Joules/sec);
$\mu_0$=absolute permeability of free space (4π×10$^{-7}$ Newtons/meter$^2$);
π=constant (3.14);
u=running variable of the integral;
$\alpha^{(0)}(iu)$=ground state polarizability of the atom/molecule (described below);
q=running variable of the integral;
e=constant (2.718);
μ(iu)=permeability as a function of imaginary frequency;
∈(iu)=permittivity as a function of imaginary frequency;
μ(ω)=effective permeability of the metamaterial;
∈(ω)=effective permittivity of the metamaterial;
$\omega_{Pm}$ and $\omega_{Tm}$=fixed magnetic frequencies of the metamaterial;
$\gamma_m$=magnetic absorptive gain(/loss) of the metamaterial;
$i\omega\gamma_m$=imaginary magnetic loss of the metamaterial;
$\omega_{Pe}$ and $\omega_{Te}$=fixed electric frequency of the metamaterial;
$\gamma_e$=electric absorptive gain(/loss) of the metamaterial;
$i\omega\gamma_e$=imaginary electric loss of the metamaterial; and
ω=frequency associated with permittivity ∈ and permeability μ.

An adequate repulsive force $\tilde{U}$ between the atom/molecule and the surface may be generated when the following condition is met:

$$U/kT = \tilde{U} > 1$$

wherein:
U=van der Waals potential (e.g., $U(z_A)$);
k=Boltzmann's constant (1.38×10$^{-23}$ Joules/Kelvin); and
T=temperature in Kelvin.

In the example shown in FIGS. 1A and 1B, a metamaterial having a strong magnetic response relative to a weaker electric response in the optical region may be characterized by parameters $\omega_{Pm}$, $\omega_{Tm}$, $\gamma_m$ and parameters $\omega_{Pe}$, $\omega_{Te}$, $\gamma_e$, wherein: $\omega_{Pm}$ and $\omega_{Tm}$ are the magnetic frequencies; $\gamma_m$ is the magnetic absorptive gain(/loss) of the metamaterial; $\omega_{Pe}$ and $\omega_{Te}$ are the electric frequencies; and $\gamma_e$ is the electric absorptive gain(/loss) of the metamaterial. In the example shown in FIGS. 1A and 1B, a metamaterial may have approximate values for the above-described parameters as follows: $\omega_{Pm}$=1.0e15, $\omega_{Tm}$=2.5e15, $\gamma_m$=1.0e14, $\omega_{Pe}$=1.0e14, $\omega_{Te}$=2.5e15, and $\gamma_e$=1.0e14. Metamaterials may be fabricated to have a wide variety of such parameters and may exhibit a strong magnetic response relative to a weaker electric response in the optical region sufficient to generate the repulsive potential. As was indicated above, the magnetic permeability response is preferably in the range of 5 to 15 (absolute value) or larger and is preferably larger than the absolute value of electrical permittivity response by a factor of up to 10 or larger. Such parameters may result in the generation of the repulsive force between a surface of the metamaterial and an atom/molecule in a fluid located in proximity to the surface.

In one example, the fluid may be comprised of water that is located in proximity to the surface such as, for example, water flowing past or around a propeller blade such as that of a pump. The atom/molecule may form a part of the water which is located in proximity to or which is flowing past the surface of the propeller blade. The propeller blade may include the metamaterial which may be applied to the surface of the blade or which may be integrated or otherwise incorporated into the surface. The metamaterial may have values for $\omega_{Pm}$, $\omega_{Tm}$, $\gamma_m$ and parameters $\omega_{Pe}$, $\omega_{Te}$, $\gamma_e$, which result in the generation of the repulsive force between the atom/molecule and the surface. As a result of the repulsive force acting between the surface and the surrounding fluid, the viscous drag of the fluid on the surface may be reduced.

In this same manner, the metamaterial may be applied to any surface for use in any fluid medium including gas and liquid mediums and combinations thereof. For example, the metamaterial may be applied to or integrated into any surface of any vehicle or object traveling through the atmosphere in order to reduce viscous fluid drag between the surface of the vehicle or object and the air and/or liquid medium of the atmosphere. Likewise, the metamaterial may be applied to or integrated into any object over which fluid moves relative to the object including stationary objects or vehicles or moving objects or vehicles.

One step in calculating the repulsive potential is evaluating the polarizability of the atom/molecules in the fluid. Referring to FIG. 2, shown is an example of polarizability vs. imaginary frequency for water for which a software program may be used to compute an approximation of the polarizability in accordance with an embodiment of the disclosure. As was indicated above, the water may (i.e., fluid) may be located in proximity to the surface or which may move relative to the surface to which the metamaterial is applied or integrated. Application of the metamaterial to the surface may result in the establishment of a repulsive potential between the surface and atoms/molecules of the water that are in proximity to the surface. The repulsive potential may result in a repulsive force between the surface and atoms/molecules that make up the fluid (e.g., water) to reduce viscous friction between the surface and the fluid. Although this embodiment is shown for water, other fluids (i.e., gasses and liquids) including air (e.g., oxygen and nitrogen) may also be used in similar fashion.

The process of calculating repulsive potential requires evaluation of the ground state polarizability of the atom (molecule) in the lowest non-vanishing order of perturbation theory given in the expansion form below disclosed as Equation (3) on Page 3 of Buhmann:

$$\alpha^{(0)}(\omega) = \lim_{\epsilon \to 0} \frac{2}{3\hbar} \sum_k \frac{\omega_{k0}}{\omega_{k0}^2 - \omega^2 - i\omega\epsilon} |d_{0k}|^2$$

wherein:
$\alpha^{(0)}(\omega)$=ground state polarizability of atom/molecule;
$\hbar$=Planck's constant (6.62×10$^{-34}$ Joules/sec);
$\omega_{k0}$=atomic transition frequency;
ω=frequency associated with the polarizability;
iω∈=imaginary loss; and
$d_{0k}$=atomic electric-dipole transition matrix element.

In one example, the polarizability may be determined using the above-mentioned software program entitled "General Atomic and Molecular Electronic Structure System" (GAMESS) and described by M. W. Schmidt et al., J. Compu. Chem. 14(11) 1347 (1993), the entire contents of which are incorporated by reference herein, as an ab initio program which facilitates ab initio calculations that treat all electrons explicitly or omit core orbitals through the use of effective core potentials. The plot of FIG. 2 illustrating the polarizability of water vs. imaginary wavelength frequency (i*ω) may be calculated using the GAMESS software program and plotted as shown as the curve denoted "GAMESS Hessian." Also shown in the graph of FIG. 2 is a plot denoted as "Expansion fit" generated using expansion fit parameters in the equation for alpha in Buhmann on Page 3. The example plot of FIG. 2 uses the following expansion fit parameters: $\omega_{k0}$=4.0e16 radians/second; $d_{k0}$=2.0e-24 Coulomb-meters; and $\in$=0.1 $\omega_{k0}$ radians/second although a wide variety of different expansion fit parameters may be used to determine polarizability. Once determined, a polarizability value (i.e., $\alpha^{(0)}(\omega)$) may be inserted into the equation for determining the van der Waals potential $U(z_A)$ for the metamaterial as described above and referenced as Equation (27) of Buhmann.

FIG. 3 illustrates the normalized van der Waals potential vs. distance ($z_A$) of water atoms/molecules from a wall or surface having a metamaterial in one embodiment applied thereto or integrated into the surface. More specifically, the graph of FIG. 3 illustrates variations in the repulsive potential between the metamaterial surface and water that occur as a function of variations in electrical response $\in$ in accordance with one embodiment. For example, FIG. 3 shows the normalized potential for a metamaterial characterized by parameters $\omega_{Pm}$=1.0e15, $\omega_{Tm}$=2.5e15, $\gamma_m$=1.0e14 and having a permeability μ=(3.0, 4.0) wherein 3.0 and 4.0 are the real and imaginary parts, respectively, of the permeability μ.

The variations in the repulsive potential can be seen with reference to curves 10, 12 and 14. Curve 10 is a plot of the normalized potential as a function of distance zA from the metamaterial surface (e.g., wall) for permittivity $\in$=(1.1, 0.16) wherein 1.1 and 0.16 are the real and imaginary parts, respectively, of the permittivity $\in$. Curve 12 is a plot of normalized potential for permittivity $\in$=(1.01, 0.04) while curve 14 is a plot of potential for permittivity $\in$=(1.001, 0.00). As can be seen in FIG. 3, although the normalized potential increases in curves 10 and 12 with decreases in permittivity $\in$, the normalized potential of curve 14 goes to 0 for a relatively small decrease in permittivity $\in$=(1.01, 0.04) as compared to the permittivity associated with curves 10 and 12. In this regard, FIG. 3 illustrates that the normalized potential is sensitive to the electrical response (i.e., value of permittivity $\in$) for a given value of permeability μ. As such, it can be seen that the electrical response (i.e., permittivity $\in$) of a given metamaterial with respect to a fluid (e.g., water) must be optimized with regard to the magnetic response (i.e., permeability μ) in order to maximize the repulsive potential.

Referring to FIG. 4A, shown is a diagrammatic illustration of a simulated nanofabricated metamaterial 20 in accordance with one embodiment of the present disclosure. The metamaterial 20 may comprise silver nano-rods 22 spaced at a given distance and sized and configured in order to provide a magnetic permeability resonant response. In the exemplary metamaterial 20 embodiment, the nano-rods 22 may have a diameter "d" of between approximately 8-12 nanometers (nm) and a center-to-center spacing "s" of between approximately 32-40 nm and a depth "h" of suitable size. More preferably, the nano-rods 22 may have a diameter "d" of approximately 10 nm and a spacing "s" of approximately 36 nm. The nano-rods 22 may be mounted on or integrally formed with a substrate which may comprise the surface. Optionally, the substrate may comprise a separate component such as an appliqué that may be applied to or incorporated into the surface. As can be seen, the simulated metamaterial 20 embodiment of FIG. 4A exhibits a resonant magnetic frequency ω of approximately 5.03e15 radians/second at a wavelength λ of approximately 0.375 microns (μm) with a magnetic permeability of −20 as shown in FIG. 4B and as described in greater detail below. In this regard, FIG. 4A illustrates that a metamaterial 20 configured to generate a repulsive potential may exhibit a resonant frequency ω at a given wavelength or range or wavelengths.

Although the metamaterial 20 in FIG. 4A is shown as an arrangement of spaced silver rods having a generally cylindrical shape, a variety of alternative sizes, shapes and configurations are contemplated. For example, the metamaterial 20 may be comprised of nano-particles 26 that may be provided in a variety of arrangements and which may be configured in a variety of shapes including, without limitation, spheres, prisms and other orthogonal shapes and which may be positioned in spaced relation to one another on a substrate 32 or on the surface. The spheres, rods, prisms or other geometric shapes may be arranged in a linear pattern or in a matrix pattern or in any other suitable two-dimensional and/or three-dimensional pattern which may be applied to a substrate 32 or surface. In addition, the metamaterials 20 may be fabricated of any number of different materials including metallic and non-metallic materials and/or combinations thereof.

FIG. 4C illustrates an array of nano-spheres 24 of diameter "d" and arranged at a spacing "s." The size, spacing, and material composition of the nano-spheres 24 may be configured to provide a magnetic resonant response at a range of frequencies similar to the magnetic resonant response of the metamaterial 20 of FIG. 4A wherein the response thereof is illustrated in FIG. 4B as described below. However, the metamaterial 20 may be formed in any suitable configuration and in any size and shape and of any material or combinations thereof that results in permeability and permittivity properties sufficient to establish a repulsive potential.

The metamaterial 20 is preferably specifically configured to have a permeability absolute value of up to approximately 25 or greater in the frequencies of between approximately $10^{14}$ and $10^{16}$ Hz although other frequencies are contemplated. In a more preferable embodiment, the metamaterial 20 may have a permeability of between approximately 5 and 15. The permeability absolute value is preferably larger than the permittivity absolute value by a factor of up to about 10. The parameters of the metamaterial 20 are preferably such that a repulsive force Ũ between the atom/molecule of a fluid proximate the surface is generated when Ũ/kT=Ũ>1 as was described above.

Referring to FIG. 4B, shown is a plot of the real part of magnetic permeability Re(μ) as function of the frequency omega ω (rad/s) to illustrate the magnetic response for the exemplary metamaterial 20 of FIG. 4A. The plot of permeability μ vs. frequency (ω) illustrates a resonant frequency at ω=5.03e15 matching a resonant frequency of the fluid located proximate or adjacent to the metamaterial 20 surface. As can be seen, the magnetic permeability μ is sharply negative at the resonant frequency ω=5.03e15 illustrating the resonant frequency ω of the metamaterial 20 at the wavelength λ of approximately 0.375 microns (μm).

Figure 5C:
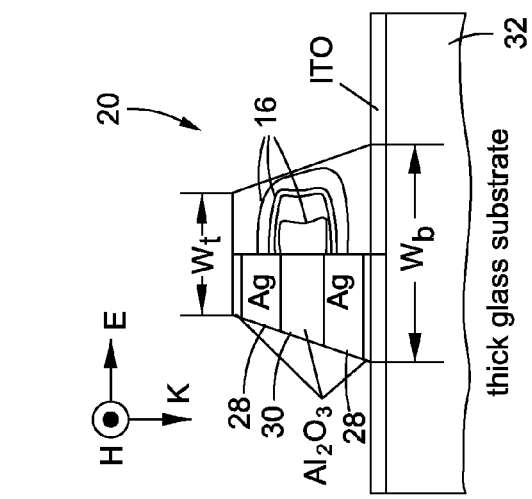
FIG. 5C is a cross section of the unit cell of FIG. 5A showing post-fabrication structure and further illustrating the total B-field lines within the cross section of the unit cell.
Figure 5B:
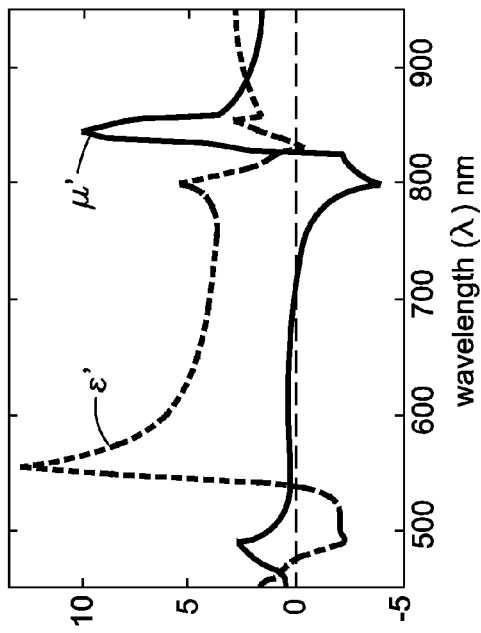
FIG. 5B is a graph showing the real parts of permittivity "$\in$" (shown in dashed) and permeability "$\mu$" (shown in solid) as a function of wavelength frequency "$\omega$" for the unit cell of FIG. 5A.
Figure 5A:
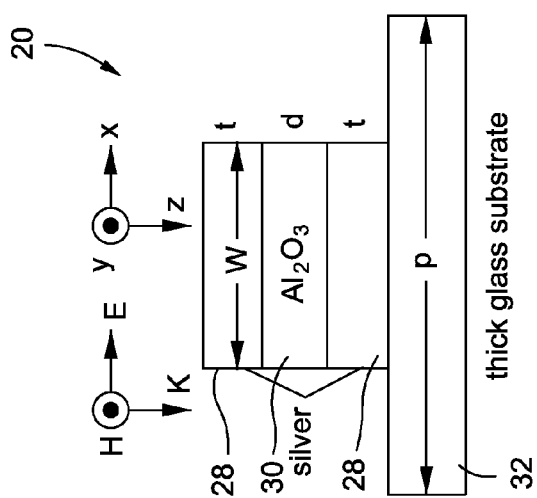
FIG. 5A is a cross sectional diagram illustrating a unit cell for an array of coupled silver nano-strips for a nanofabricated metamaterial in accordance with the principles of the invention.

Referring to FIG. 5A, shown is an example of a negative index metamaterial (NIM) wherein the electrical permittivity and the magnetic permeability both have negative values. The metamaterial 20 of FIG. 5A comprises a unit cell formed on a substrate 32 and having an array of coupled silver nano-strips 28 in accordance with an embodiment disclosed herein. FIGS. 5A-5C are taken from the Yuan reference mentioned above and entitled "A Negative Permeability Material at Red Light," Page 1078. The thickness of both silver nano-strips 28 is represented by "t" whereas "d" represents a thickness of the alumina spacer 30 which may comprise aluminum oxide ($Al_2O_3$) in an exemplary embodiment. The cell in FIG. 5A has a width "w" of between approximately 120-160 nm and more preferably 140 nm, a thickness "t" of between approximately 32-38 nm and more preferably 35 nm, a depth "d" of between approximately 37-43 nm and more preferably 40 nm, and periodicity "p" of between approximately 280-320 nm and more preferably 300 nm in an x-direction and is of infinite length in the y-direction. The silver nano-strips 28 may be considered to be infinite in y and periodic in x with period p in accordance with an x, y, z, orientation shown in FIG. 5A.

FIG. 5B is a graph illustrating real parts of permittivity $\in'$ ($Re(\mu)$ shown in solid) and permeability $\mu'$ ($Re(\omega)$ shown in dashed) for the above-described cell of FIG. 5A. In plotting the permittivity $\in'$ ($Re(\mu)$ and permeability $\mu'$ for the cell, optical constants of bulk silver are used for the nano-strips 28 and the refractive index of the substrate 32 is 1.52. As can be seen, the cell exhibits a negative magnetic response (permeability $\mu'$) and a negative electric response (permittivity $\in'$) at a wavelength of about 825 nm. However, the cell exhibits a sufficiently large positive magnetic response relative to the permittivity response absolute value at wavelengths of between approximately 825 nm and 850 nm such that a repulsive potential may result. As indicated above, such a response is illustrative of one of a variety of responses exhibited by different metamaterials that may result in a sufficiently large difference between permeability and permeativity to generate a repulsive potential such as the van der Waals potential $Uz_A$ described above. In this regard, a wide variety of metamaterials having a variety of alternative structural arrangements and constructed of a variety of alternative material compositions with different material properties may result in negative (or positive) permittivity and permeability response in a variety of alternative wavelengths such that the difference between the absolute values of permeability and permittivity is sufficient to establish a repulsive potential.

The left half of FIG. 5C illustrates an actual cross-section after fabrication of the simulated unit cell of FIG. 5A. The cell of FIG. 5C has a trapezoidal cross sectional shape with bottom width $w_b$ and top width $w_t$ and is formed on the substrate 32 and having an array of coupled silver nano-strips 28 separated by an alumina spacer 30 comprised of aluminum oxide ($Al_2O_3$). The right half FIG. 5C shows that the total B-field lines extending between the upper and lower nano-strips 28 are opposite to the incident H-field at the magnetic resonance. The B-field lines represent the magnetic flux density and the H-field represents the magnetic field intensity of the magnetic field.

For a metamaterial fabricated in accordance with any of the embodiments as disclosed above or otherwise fabricated, the metamaterial preferably has a high magnetic permeability (absolute value) and a low electrical permittivity (absolute value). More specifically, the metamaterial preferably has an absolute value of magnetic permeability $\mu(\omega)$ of up to approximately 25 (i.e., $-25 \leq \mu(\omega) \leq 25$) although the absolute value of the magnetic permeability may be greater than 25. The metamaterial preferably has a magnetic permeability that is greater than an absolute value of electrical permittivity of the metamaterial by up to a factor of approximately 10 or higher and at frequencies preferably in the range of between approximately $10^{14}$ and $10^{16}$ Hz although other frequencies are contemplated.

With such parameters, the metamaterial may be sufficient to generate the repulsive force between the metamaterial on the surface and the fluid flowing over the surface. In one embodiment, the metamaterial may be configured as an appliqué that may be bonded to a surface such as an exterior surface or outer surface of an aircraft wing. However, the metamaterial may be applied to a variety of different surfaces and for different applications and using different attachment mechanism and is not solely limited to application via bonding to air vehicles or turbine blades for reducing viscous drag of a fluid passing thereover.

The present disclosure also may include a method of reducing the viscous drag of a fluid moving past a surface such as by application of a metamaterial to the surface. The method may include the step of generating a repulsive force between the surface and the fluid using a metamaterial such as a negative index metamaterial applied to or otherwise disposed on the surface. The generating step may include reversing the Casimir-Polder-Lifshitz force between the negative index material and atoms/molecules of the fluid. The generating step may also comprise reversing the van der Waals force between the negative index material and the atoms/molecules of the fluid.

In this regard, the generating step may include generating the repulsive force using the metamaterial which preferably has a relatively strong magnetic resonant response (i.e., $-25 \leq \mu(\omega) \leq 25$) to frequencies in the $10^{14}$ to $10^{16}$ Hz region in combination with a relatively weak electric resonance response at these frequencies as described above. The generating step may further include generating the repulsive force using a metamaterial having parameters that result in a normalized repulsive potential of at least 1.0. The metamaterial may be characterized by a variety of different parameters including, but not limited to, $\omega_{Pm}$, $\omega_{Tm}$, $\gamma_m$ and $\omega_{Pe}$, $\omega_{Te}\gamma_e$, wherein: $\omega_{Pm}$ and $\omega_{Tm}$ are the fixed magnetic frequencies of the metamaterial; $\gamma_m$ is the magnetic absorptive gain(/loss) of the metamaterial; $\omega_{Pe}$ and $\omega_{Te}$ are the fixed electric frequencies of the metamaterial; and $\gamma_e$ is the electric absorptive gain(/loss) of the metamaterial as described above.

In a further embodiment, the disclosure may include a method of reducing the viscous drag between the surface and the fluid by forming a left-handed metamaterial and applying the metamaterial to the surface such as by bonding an appliqué thereto or applying or integrating the metamaterial to the surface using any suitable means. The method may further comprise moving the surface relative to the fluid wherein the metamaterial generates the repulsive force between the metamaterial and the fluid.

The step of forming the metamaterial may include evaluating the ground state polarizability of an atom/molecule in the lowest non-vanishing order of perturbation theory given in an expansion form as described above. The step of forming the metamaterial may comprise determining the magnetic permeability and the electrical permittivity necessary to effect a reversal of the attractive force between the fluid and the surface wherein the attractive force may be the van der Waals force.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for reducing viscous drag of a fluid on a surface, comprising:
   a metamaterial having magnetic permeability response at a range of frequencies;
   wherein:
   the metamaterial is comprised of a plurality of nano-particles having a diameter of between approximately 8-12 nanometers and being mounted in spaced relation to one another on the surface and configured in a spacing causing the nano-particles to have a magnetic permeability response generating a repulsive force between the surface and the fluid;
   the metamaterial reducing viscous drag of the fluid on the surface in response to the repulsive force between the surface and the fluid.

2. The system of claim 1 wherein:
   the frequencies are within the range of between approximately $10^{14}$ and $10^{16}$ Hz.

3. The system of claim 1 wherein:
   the magnetic permeability has an absolute value of up to at least approximately 25.

4. The system of claim 3 wherein:
   the magnetic permeability absolute value is within the range of between approximately 5 and 15.

5. The system of claim 1 wherein:
   the absolute value of the magnetic permeability is greater than the absolute value of the electric permittivity by a factor of up to at least 10.

6. The system of claim 1 wherein:
   the repulsive force is represented by $\tilde{U}$ and being greater than 1, the repulsive force $\tilde{U}$ being calculated according to the formula:

$$\tilde{U}=U/kT>1$$

wherein U represents a van der Waals potential, k represents Boltzmann's constant and T represents temperature in Kelvin.

7. The system of claim 1 wherein:
   the surface is comprised of at least one of an aerodynamic surface and a hydrodynamic surface.

8. The system of claim 7 wherein:
   the aerodynamic surface comprises at least one of an aircraft wing, a tail surface, a control surface, a fuselage, a propeller blade, a turbine blade.

9. The system of claim 1 wherein:
   the metamaterial is configured such that the magnetic permeability and the electric permittivity of the metamaterial have negative values.

10. The system of claim 1 wherein:
    an absolute value of the magnetic permeability of the metamaterial is substantially greater than an absolute value of the electric permittivity of the metamaterial.

11. The system of claim 1 wherein:
    the nano-particles are mounted in spaced relation to one another on the surface at a spacing of between approximately 32-40 nanometers.

12. A method of reducing the viscous drag of a fluid moving relative to a surface, comprising:
    providing the metamaterial of claim 1;
    producing relative motion between the surface and the fluid; and
    generating a repulsive force between the surface and the fluid.

13. The method of claim 12 wherein:
    the generating step includes generating the repulsive force from the metamaterial having a magnetic permeability response at a range of frequencies between approximately $10^{14}$ and $10^{16}$ Hz.

14. The method of claim 12 wherein:
    the repulsive force is established by selecting the metamaterial to have a magnetic permeability absolute value of up to at least approximately 25.

15. The method of claim 12 wherein:
    the metamaterial has an electric permittivity;
    the repulsive force is established by selecting the metamaterial to have a magnetic permeability of absolute value that is greater than an absolute value of the electric permittivity by a factor of up to at least 10.

16. The method of claim 12 wherein:
    the repulsive force of the metamaterial is established by selecting the metamaterial to have a repulsive potential $\tilde{U}$ that is greater than 1, the repulsive force $\tilde{U}$ being calculated according to the formula:

$$\tilde{U}=U/kT>1$$

wherein U represents a van der Waals potential, k represents Boltzmann's constant and T represents temperature in Kelvin.

* * * * *